(12) United States Patent
Pastorello et al.

(10) Patent No.: US 8,522,635 B2
(45) Date of Patent: Sep. 3, 2013

(54) HYBRID PROPULSION SYSTEM FOR A MOTOR VEHICLE WITH A DOUBLE-DRUM GEAR CONTROL DEVICE

(75) Inventors: Valter Pastorello, Orbassano (IT); Marco Garabello, Orbassano (IT); Gianluigi Pregnolato, Orbassano (IT); Andrea Piazza, Orbassano (IT); Fabio Pesola, Orbassano (IT)

(73) Assignee: C.R.F. Societa' Consortile per Azioni, Orbassano, Turin (IT)

( * ) Notice: Subject to any disclaimer, the term of this patent is extended or adjusted under 35 U.S.C. 154(b) by 279 days.

(21) Appl. No.: 12/946,599

(22) Filed: Nov. 15, 2010

(65) Prior Publication Data
US 2011/0265601 A1 Nov. 3, 2011

(30) Foreign Application Priority Data
May 3, 2010 (EP) .................................. 10425144

(51) Int. Cl.
*F16H 59/00* (2006.01)
*F16H 61/00* (2006.01)
*F16H 63/00* (2006.01)

(52) U.S. Cl.
USPC .................. 74/335; 74/330; 74/331

(58) Field of Classification Search
USPC ................... 74/330, 331, 335, 337.5
See application file for complete search history.

(56) References Cited

U.S. PATENT DOCUMENTS

| | | | | |
|---|---|---|---|---|
| 6,634,247 | B2 * | 10/2003 | Pels et al. ......................... | 74/329 |
| 6,799,484 | B2 * | 10/2004 | Gumpoltsberger et al. .... | 74/335 |
| 7,197,954 | B2 * | 4/2007 | Baldascini et al. ............. | 74/331 |
| 7,428,852 | B2 * | 9/2008 | Baldwin et al. ............... | 74/337.5 |
| 7,437,966 | B2 * | 10/2008 | Maillard et al. ................ | 74/335 |
| 2005/0139035 | A1 | 6/2005 | Lee et al. | |
| 2007/0209460 | A1 | 9/2007 | Baldwin et al. | |
| 2008/0134819 | A1 | 6/2008 | Kapp et al. | |

* cited by examiner

*Primary Examiner* — Ha D Ho
*Assistant Examiner* — Emily Cheng
(74) *Attorney, Agent, or Firm* — Merchant & Gould P.C.

(57) ABSTRACT

A hybrid propulsion system for a motor vehicle includes a gearbox having a gear control device and first and second shafts. The gear control device includes a first drum control device associated with the first shaft, a second drum control device associated with the second shaft and an actuation unit arranged to bring about rotation of the first and second drum control devices in a synchronized manner. The actuation unit includes a motor device, a first gear associated with the first drum control device, a second gear associated with the second drum control device, and an intermediate gear. Either of the first and second gears meshes with an output pinion of the motor device, while the intermediate gear meshes both with the first gear and with the second gear.

5 Claims, 4 Drawing Sheets

HYBRID PROPULSION SYSTEM FOR A MOTOR VEHICLE WITH A DOUBLE-DRUM GEAR CONTROL DEVICE

This application is claims benefit of Serial No. 10425144.2, filed 3 May 2010 in the European Patent Office and which application is incorporated herein by reference. To the extent appropriate, a claim of priority is made to each of the above disclosed application.

BACKGROUND OF THE INVENTION

The present invention relates in general to a hybrid propulsion system for a motor vehicle comprising an internal combustion engine, an electric machine, and a gearbox, wherein the electric machine is kinematically connected to the gearbox by means of a first drive transmission mechanism comprising a pinion carried by the output shaft of the electric machine, one of the gears of the gearbox and an intermediate gear, wherein the gearbox comprises a gear control device and a first shaft and a second shaft on which are mounted a plurality of idle gears and a plurality of slidable engagement sleeves each of which is associated with one or two idle gears to connect them for rotation with the respective first or second shaft, wherein the gear control device comprises a first drum control device associated with the first shaft to control the movement of the slidable engagement sleeves disposed on that shaft, a second drum control device associated with the second shaft to control the movement of the slidable engagement sleeves disposed on that shaft, and an actuation unit which is arranged to bring about rotation of the first and second drum control devices in a synchronized manner, wherein the actuation unit comprises a motor device and a second drive transmission mechanism, wherein the second drive transmission mechanism comprises a first gear associated with the first drum control device, a second gear associated with the second drum control device, and an intermediate gear, and wherein the first gear meshes directly or indirectly with an output pinion of the motor device and the intermediate gear meshes directly both with the first gear and with the second gear. More particularly, the invention relates to the arrangement of the intermediate gear of the above-defined second drive transmission mechanism.

SUMMARY OF THE INVENTION

The object of the present invention is to provide a more compact hybrid propulsion system for a motor vehicle of the type defined above.

This and other objects are achieved in full, according to the present invention, by means of a hybrid propulsion system for a motor vehicle of the type defined above, wherein the intermediate gear of the second drive transmission mechanism, i.e. of the drive transmission mechanism which is associated with the actuation unit of the gear control device of the gearbox, is arranged coaxially with the intermediate gear of the first drive transmission mechanism, i.e. of the drive transmission mechanism that is associated with the electric machine. This arrangement clearly allows to optimize the space available for the hybrid propulsion system.

Moreover, since they are arranged coaxially, the two intermediate gears of the first and second drive transmission mechanisms can be mounted on a common intermediate shaft with a consequent reduction in the overall number of components of the hybrid propulsion system.

Advantageously, the first and second gearbox shafts carrying the idle gears and the slidable engagement sleeves that are controlled by the first and second drum control devices of the gear control device are secondary shafts provided with respective final reduction pinions both of which are intended to mesh with a gear of the differential.

BRIEF DESCRIPTION OF THE DRAWINGS

Further features and advantages of the present invention will become clear from the following detailed description which is given purely by way of non-limiting example with reference to the appended drawings, in which.

DETAILED DESCRIPTION OF THE PREFERRED EMBODIMENTS

Figure 1:
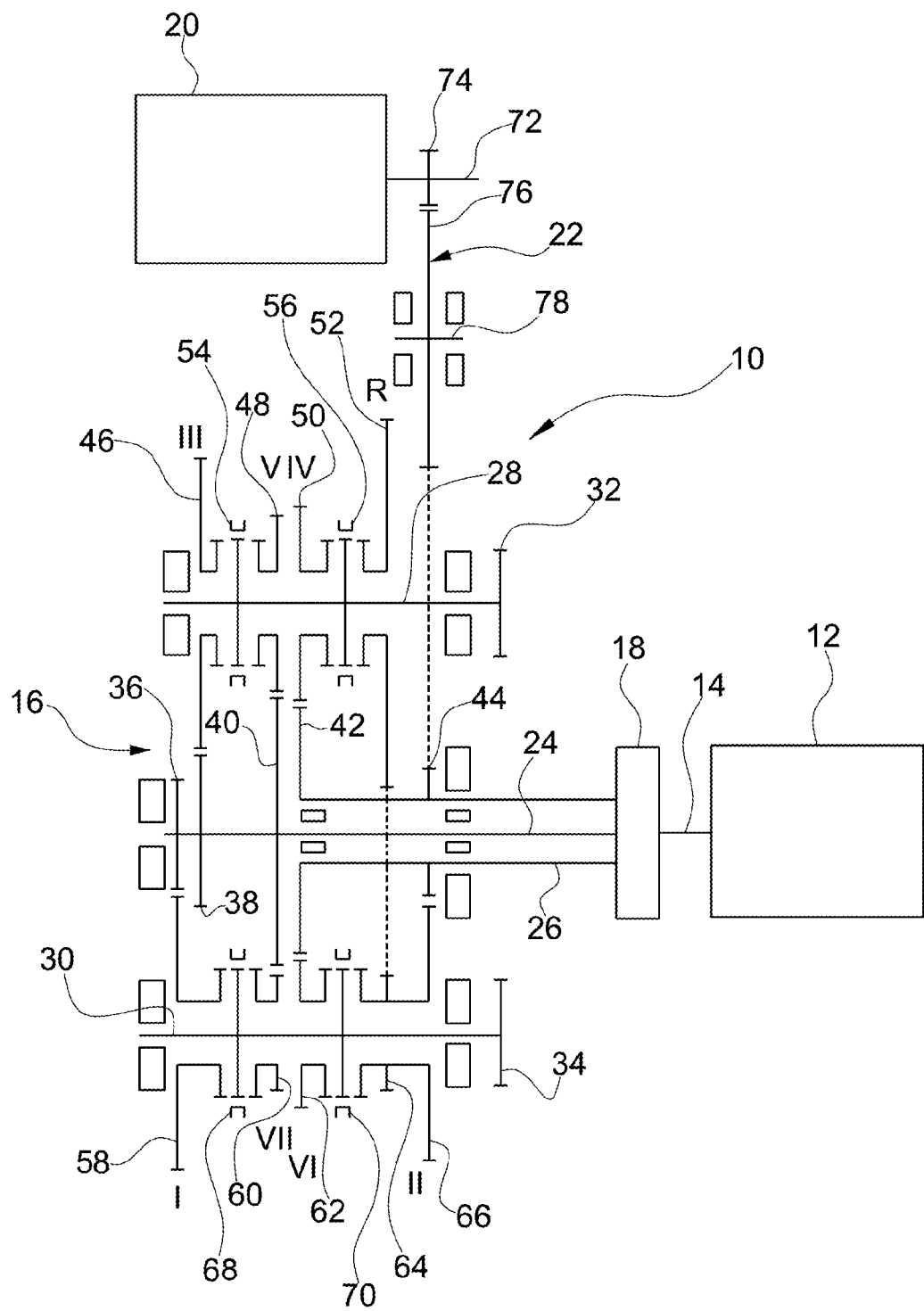
FIG. 1 is a schematic view which shows a combustion engine, a mechanical gearbox, and an electric machine forming part of a hybrid propulsion system for a motor vehicle according to an embodiment of the present invention.

With reference initially to FIG. 1, a hybrid propulsion system for a motor vehicle is generally indicated 10 and comprises, in per-se-known manner, a combustion engine 12 having a drive shaft 14, a mechanical gearbox 16 connected to the drive shaft 14 of the combustion engine 12 by means of a clutch unit 18, and an electric machine 20, which is permanently kinematically connected to the gearbox 16 by means of a first drive transmission mechanism 22. In the embodiment shown, the gearbox 16 is a double-clutch gearbox, more specifically, a gearbox with seven forward speeds and one reverse but, naturally, it could be a single-clutch gearbox and/or it could have a different number of speeds. The gearbox 16 comprises:

a first primary shaft 24, hereinafter referred to as the inner primary shaft, which can be connected torsionally to the drive shaft 14 by means of a first friction clutch (not shown in detail since it is of per-se-known type) of the clutch unit 18;

a second primary shaft 26 which can be connected torsionally to the drive shaft 14 by means of a second friction clutch (also not shown in detail since it is of per-se-known type) of the clutch unit 18, the second primary shaft 26 being arranged coaxially with, and more precisely, in the embodiment illustrated, outside of the first primary shaft 24 and hence being hereinafter referred to as the outer primary shaft; and a first secondary shaft 28 and a second secondary shaft 30 both of which are arranged parallel to the two primary shafts 24 and 26 and are provided, respectively, with a first final reduction pinion 32 and with a second final reduction pinion 34 both meshing with a gear of the differential (not shown).

The inner primary shaft 24 projects axially from the outer primary shaft 26 and carries, in order, from the end axially remote from the clutch unit 18 (the left-hand end as seen in FIG. 1) to the end axially facing the clutch unit 18 (the right-hand end as seen in FIG. 1) a gear 36 which acts as drive gear for the first speed gear train, a gear 38 which acts as drive gear for the third speed gear train, and a gear 40 which acts as drive gear both for the fifth speed gear train and for the seventh speed gear train. The outer primary shaft 26 carries, in order from left to right as seen in FIG. 1, a gear 42 which acts as drive gear both for the fourth speed gear train and for the sixth speed gear train and a gear 44 which acts as drive gear both for the second speed gear train and for the reverse gear train. The inner primary shaft 24 is therefore associated with the odd speeds (first, third, fifth and seventh), whereas the outer primary shaft 26 is associated with the even speeds (second, fourth and sixth) and with reverse. The above-mentioned drive gears 36, 38, 40, 42 and 44 are constructed as fixed gears, that is, gears which are fixed permanently for rotation with the respective shafts (shaft 24 for gears 36, 38 and 40 and shaft 26 for gears 42 and 44). For a clearer understanding of the arrangement of the gears in the gearbox 16, in FIG. 1, Roman numerals I, II, III, IV, V, VI, VII and the letter R have been placed in the regions of the planes of the gear trains associated with first speed, second speed, third speed, fourth speed, fifth speed, sixth speed, seventh speed and reverse, respectively.

The first secondary shaft 28 carries, in order from left to right as seen in FIG. 1, a gear 46 which permanently meshes with the drive gear 38 and acts as driven gear of the third speed gear train, a gear 48 which permanently meshes with the drive gear 40 and acts as driven gear of the fifth speed gear train, a gear 50 which permanently meshes with the drive gear 42 and acts as driven gear of the fourth speed gear train, a gear 52 which acts as driven gear of the reverse gear train, and the first final reduction pinion 32. The above-mentioned gears 46, 48, 50 and 52 are constructed as idle gears and can be connected selectively for rotation with the secondary shaft 28 by means of a pair of slidable engagement sleeves 54 and 56. More precisely, the slidable engagement sleeve 54 is interposed between the gears 46 and 48 and is movable selectively to the left or to the right to connect the gear 46 or the gear 48, respectively, for rotation with the secondary shaft 28, thus bringing about the engagement of the third speed or of the fifth speed, respectively, whereas the slidable engagement sleeve 56 is interposed between the gears 50 and 52 and is selectively movable to the left or to the right to connect the gear 50 or the gear 52, respectively, for rotation with the secondary shaft 28, thus bringing about the engagement of the fourth speed or of the reverse, respectively.

The second secondary shaft 30 carries, in order from left to right as seen in FIG. 1, a gear 58 which meshes permanently with the drive gear 36 and acts as driven gear of the first speed gear train, a gear 60 which meshes permanently with the drive gear 40 and acts as driven gear of the seventh speed gear train, a gear 62 which meshes permanently with the drive gear 42 and acts as driven gear of the sixth speed gear train, a gear 64 which meshes permanently with the driven gear 52 and acts as an intermediate gear of the reverse gear train, a gear 66 which meshes permanently with the drive gear 44 and acts as driven gear of the second speed gear train, and the second final reduction pinion 34. The gears 64 and 66 are constructed as a single part or in any case are connected firmly for rotation with one another so as to form a double gear. The above-mentioned gears 58, 60 and 62 and the double gear 64, 66 are constructed as idle gears and can be connected selectively for rotation with the secondary shaft 30 by means of a pair of slidable engagement sleeves 68 and 70. More precisely, the slidable engagement sleeve 68 is interposed between the gears 58 and 60 and is movable selectively to the left or to the right to connect the gear 58 or the gear 60, respectively, for rotation with the secondary shaft 30, thus bringing about the engagement of the first speed or of the seventh speed, respectively, whereas the slidable engagement sleeve 70 is interposed between the gear 62 and the double gear 64, 66 and is movable selectively to the left or to the right to connect the gear 62 or the double gear 64, 66, respectively, for rotation with the secondary shaft 30, thus bringing about the engagement of the sixth speed or of the second speed, respectively.

The electric machine 20 is arranged parallel to the gearbox 16, that is, with an output shaft 72 thereof arranged parallel to the primary shafts 24, 26 and to the secondary shafts 28, 30 of the gearbox, and is permanently kinematically connected to one of the two primary shafts (in the embodiment illustrated, to the outer primary gearbox shaft 26, that is, to the primary shaft associated with the even speeds) of the gearbox, by means of the above-mentioned first drive transmission mechanism 22. The first drive transmission mechanism 22 is constructed as a gear train comprising a pinion 74 carried by the output shaft 72 of the electric machine 20, by an intermediate gear 76 carried by a special intermediate shaft 78 and permanently meshing with the pinion 74, and by one of the drive gears carried by one of the two primary shafts of the gearbox (in the embodiment illustrated, the gear 44 which is carried by the outer primary shaft 26 and acts as drive gear for the second speed gear train). The intermediate gear 76 is constructed, for example, as a fixed gear, that is, it is fixed for rotation with the intermediate shaft 78, in which case the intermediate shaft 78 is rotatably supported about its own axis by the gearbox housing (not shown), by known support means, not shown. The intermediate gear 76 could, however, alternatively be constructed as an idle gear, in which case the intermediate shaft 78 would be non-rotatably supported by the gearbox. By virtue of the direct connection to one of the two primary shafts of the gearbox, in addition to the conventional drive function (generation of mechanical power for the vehicle wheels, drawing energy from the vehicle high-voltage storage batteries), and generating function (generation of electrical power for the vehicle high-voltage storage batteries, drawing energy from the recovery of the vehicle kinetic or by the operation of the combustion engine with the vehicle stationary), the electric machine 20 can also perform the functions of an alternator and of a starter motor so that there is no need for an additional alternator or starter motor.

Figure 2:
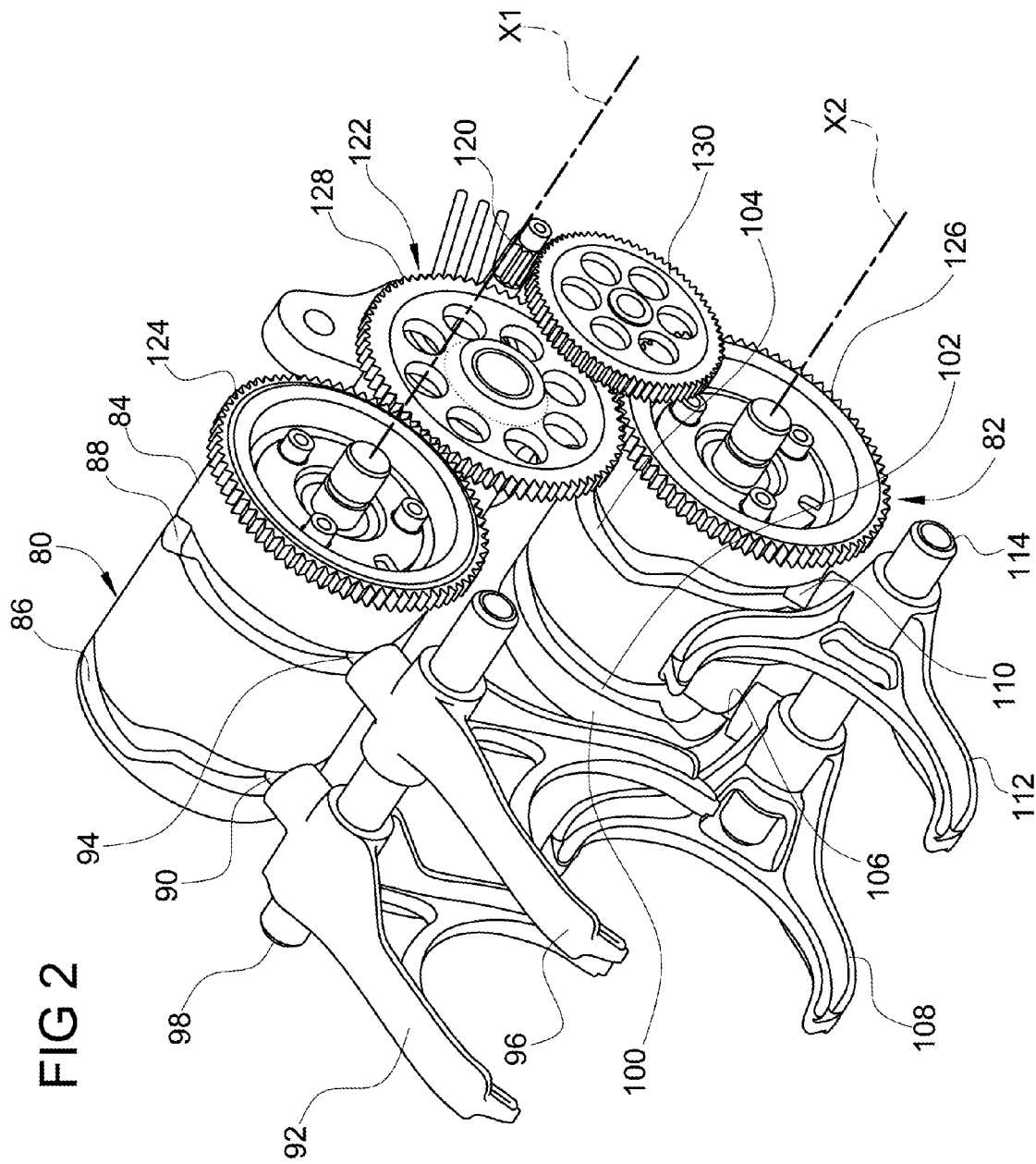
FIGS. 2 and 3 are perspective views from different viewpoints, of a gear control device associated with the gearbox of the hybrid propulsion system of FIG. 1.
Figure 3:
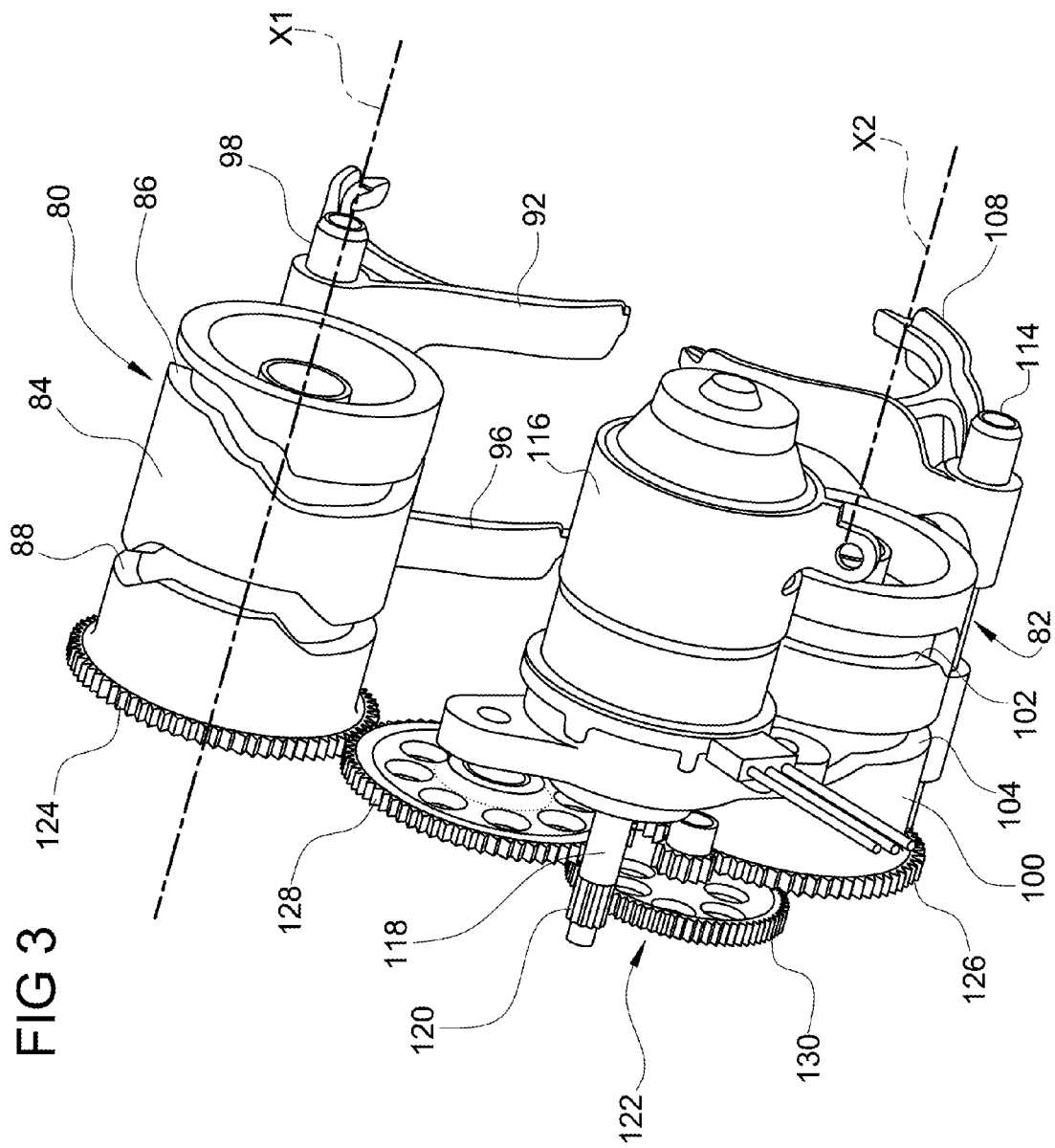
Figure 4:
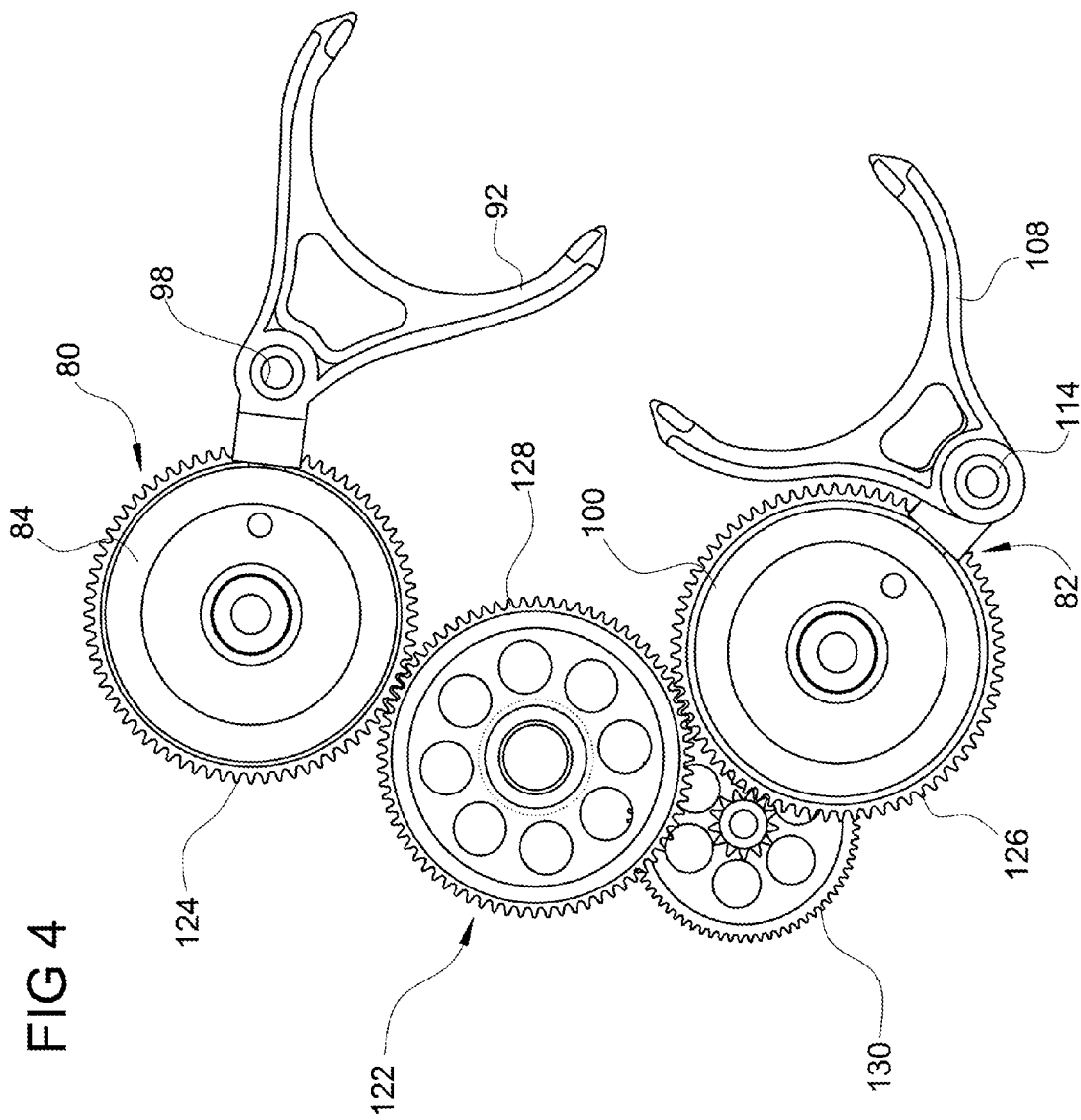
FIG. 4 is a front elevational view of the gear control device of FIGS. 2 and 3, from which the electric motor has been removed.

With reference now to FIGS. 2 to 4, the gearbox 16 is also provided with a gear control device comprising basically a first drum control device 80 which is associated with the first secondary shaft 28 to control the movement of the slidable engagement sleeves 54 and 56 that are mounted on that shaft, between the respective idle and engaged positions, and a second drum control device 82 which is associated with the second secondary shaft 30 to control the movement of the slidable engagement sleeves 68 and 70 that are mounted on that shaft, between the respective idle and engaged positions. The gear control device is of the sequential type and the two drum control devices 80 and 82 are therefore operated in a synchronized manner, as will be better explained in the following description.

In the embodiment shown in FIGS. 2 to 4, the two drum control devices 80 and 82 are of the single drum type. More specifically, the first drum control device 80 comprises a rotary drum 84, the rotation axis (indicated X1) of which coincides with the geometrical axis of the drum and is arranged parallel to the axes of the shafts 24, 26, 28 and 30 of the gearbox 16. Two guide channels 86 and 88 are provided, in order, from left to right as seen in FIG. 2, on the outer cylindrical surface of the drum 84. A pin or other follower member 90 is engaged slidably in the guide channel 86 and is connected for translation axially, that is, parallel to the axis X1, with a shift fork 92 which in turn is connected for translation axially with the slidable engagement sleeve 54 associated with the third and fifth speeds. A pin or other follower member 94 is engaged slidably in the guide channel 88 and is connected for translation axially with a shift fork 96 which in turn is connected for translation axially with the engagement sleeve 56 associated with the fourth speed and with the reverse. The shift forks 92 and 96 which are controlled by the first drum control device 80 are mounted for sliding along a stationary rod 98 which is supported by the gearbox housing, but they could also be mounted so as to be fixed for translation with an axially slidable rod. Similarly, the second drum control device 82 comprises a rotary drum 100, the rotation axis (indicated X2) of which coincides with the geometrical axis of the drum and is arranged parallel to the axes of the shafts 24, 26, 28 and 30 of the gearbox 16. Two guide channels 102 and 104 are provided, in order, from left to right as seen in FIG. 2, on the outer cylindrical surface of the drum 100. A pin or other follower member 106 is engaged slidably in the guide channel 102 and is connected for translation axially, that is, parallel to the axis X2, with a shift fork 108 which in turn is connected for translation axially with the slidable engagement sleeve 68 associated with the first and seventh speeds. A pin or other follower member 110 is engaged slidably in the guide channel 104 and is connected for translation axially with a shift fork 112 which in turn is connected for translation axially with the engagement sleeve 70 associated with the sixth and second speeds. The shift forks 108 and 112 which are controlled by the second drum control device 82 are mounted for sliding along a stationary rod 114 which is supported by the gearbox housing, but they could also be fixed for translation with an axially slidable rod.

The gear control device further comprises an actuation unit which is arranged to bring about rotation of the drums 84 and 100 of the two drum control devices 80 and 82 in a synchronized manner. The actuation unit comprises a motor 116 (FIG. 3), for example, an electric motor, having an output shaft 118 provided with a pinion 120, and a second drive transmission mechanism 122 having a first gear 124 associated with the first drum control device 80, a second gear 126 associated with the second drum control device 82, and a third gear 128 which mashes permanently with both of the gears 124 and 126 and is therefore referred to hereinafter as an intermediate gear. The first gear 124 is coaxial and fixed for rotation with the rotary drum 84 of the first drum control device 80. Similarly, the second gear 126 is coaxial and fixed for rotation with the rotary drum 100 of the second drum control device 82. The second gear 126 meshes indirectly with the pinion 120 of the motor 116 via a reduction gear 130 constituted, for example, by a double gear, but could also mesh directly with the pinion 120. The rotary motion imparted by the motor 116 to the pinion 120 is thus transmitted, by means of the second drive transmission mechanism 122, to the rotary drums 84 and 100 of the two drum control devices 80 and 82, the rotary drums 84 and 100 rotating in a synchronized manner by virtue of the indirect connection between the associated gears 124 and 126 through the intermediate gear 128. According to the invention, the intermediate gear 128 is arranged coaxially with the intermediate gear 76 of the first drive transmission mechanism 22, as it is also mounted on the intermediate shaft 78, beside the intermediate gear 76. The intermediate gear 128 may be constructed as a fixed gear or as an idle gear but in any case must be able to rotate independently of the intermediate gear 76. Naturally, the coaxial arrangement of the two gears 76 and 128 which act as intermediate gears for the two drive transmission mechanisms 22 and 122 allows to optimize the space available in the vehicle. Moreover, the fact that both the intermediate gears 76 and 128 are mounted on the intermediate shaft 78 allows to reduce the overall number of components of the hybrid propulsion system.

Naturally, the principle of the invention remaining unchanged, the embodiments and details of construction may be varied widely with respect to those described and illustrated purely by way of non-limiting example.

For example, although the invention is described and illustrated herein with reference to an embodiment in which the two drum control devices of the gear control device are of the single-drum type, it is equally applicable to a hybrid propulsion system for a motor vehicle with a gear control device comprising double-drum control devices. In this case, each drum control device will comprise a pair of coaxial rotary drums and the gear control device will comprise a pair of actuation units each of which is arranged to bring about rotation in a synchronized manner of a respective rotary drum of the first drum control device and of a respective rotary drum of the second drum control device. Each actuation unit will comprise a respective motor device and a respective second drive transmission mechanism including a first gear associated with a respective rotary drum of the first drum control device, a second gear associated with a respective drum of the second drum control device and a third, intermediate gear permanently meshing with the first and second gears, the first gear meshing directly or indirectly with the pinion of the respective motor device. The two intermediate gears of the two second drive transmission mechanisms will, in this case, both be arranged coaxially with the intermediate gear of the first drive transmission mechanism.

What is claimed is:

1. A hybrid propulsion system for a motor vehicle comprising a combustion engine, an electric machine, and a gearbox,
   wherein the electric machine is kinematically connected to the gearbox by a first drive transmission mechanism comprising a pinion carried by an output shaft of the electric machine, a gear of the gearbox and a first intermediate gear;
   the gearbox comprising a gear control device and first and second shafts on which are mounted a plurality of idle gears and a plurality of slidable engagement sleeves, each of which is associated with one or two idle gears to connect the idle gears for rotation with the respective first or second shaft;
   the gear control device comprising a first drum control device associated with the first shaft to control the movement of the slidable engagement sleeves disposed on the first shaft, a second drum control device associated with the second shaft to control the movement of the slidable engagement sleeves disposed on the second shaft, and an actuation unit arranged to bring about rotation of the first and second drum control devices in a synchronized manner;
   the actuation unit comprising at least one motor device and a second drive transmission mechanism;
   the second drive transmission mechanism comprising at least one first gear associated with the first drum control device, at least one second gear associated with the second drum control device, and at least one second intermediate gear, the at least one first gear or at least one second gear meshing directly or indirectly with an output pinion of the at least one motor device and the at least one second intermediate gear meshing with the at least one first gear and with the at least one second gear; and
   wherein the at least one second intermediate gear is arranged coaxially with the first intermediate gear.

2. A hybrid propulsion system according to claim 1, wherein each of the first and second drum control devices comprises a single rotary drum, and wherein the at least one first and second gears of the second drive transmission mechanism are fixed for rotation, respectively, with the rotary drum of the first drum control device, and with the rotary drum of the second drum control device.

3. A hybrid propulsion system according to claim 1, wherein the first intermediate gear and the at least one second intermediate gear are mounted on a common intermediate shaft of the gearbox, distinct from the first and second shafts.

4. A hybrid propulsion system according to claim 1, wherein the first and second shafts of the gearbox are secondary shafts.

5. A hybrid propulsion system according to claim 1, wherein the motor device is an electric motor.

* * * * *